Patented May 1, 1928.

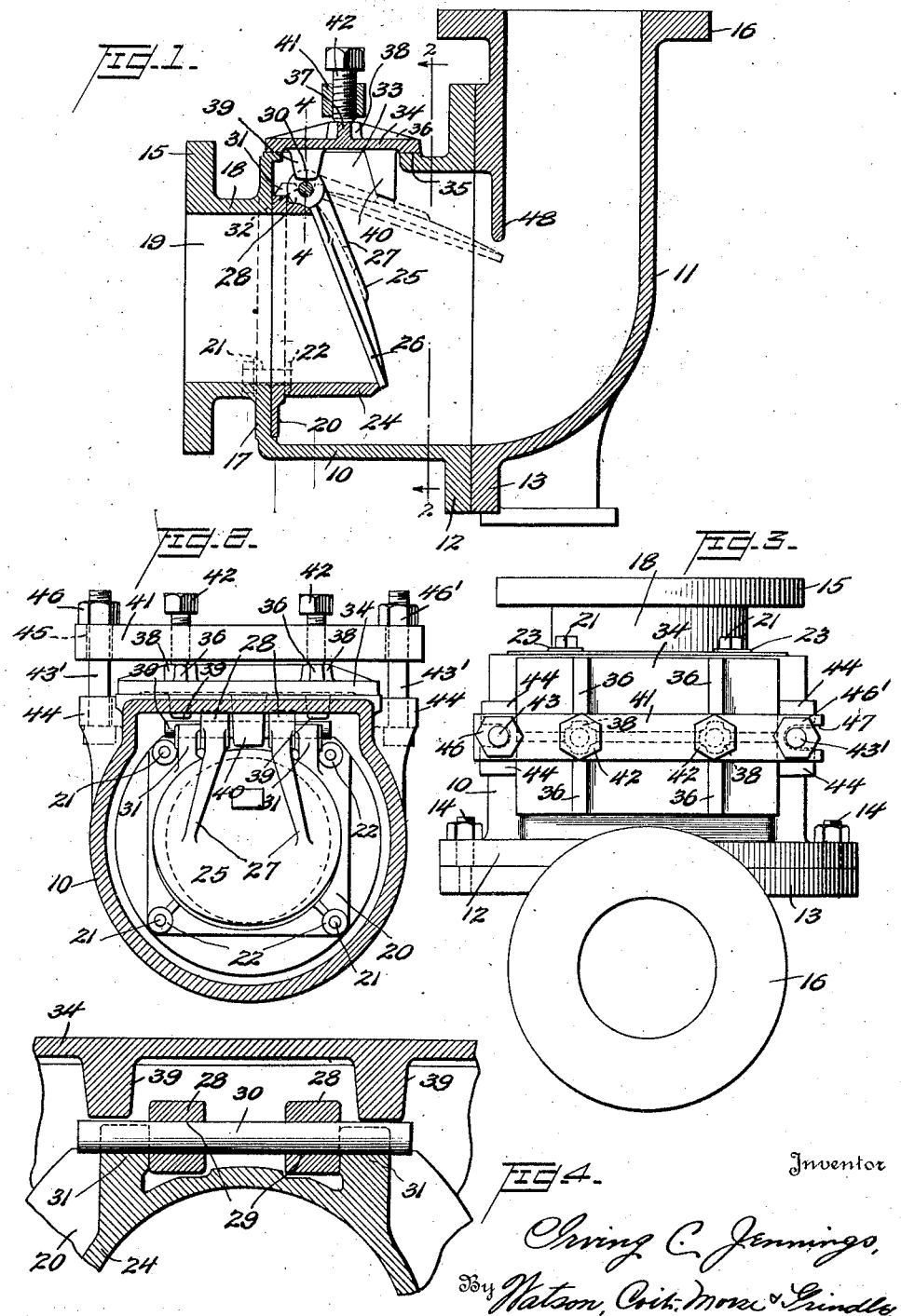

1,668,456

UNITED STATES PATENT OFFICE.

IRVING C. JENNINGS, OF SOUTH NORWALK, CONNECTICUT.

CHECK VALVE.

Application filed April 24, 1924. Serial No. 708,792.

This invention relates to check valves and more particularly to check valves of the type used in sewage ejection apparatus.

A common fault with the usual type of check valve as used in sewage systems is the tendency of the check valves to become clogged with particles of solid matter thus preventing their proper closure. In order to remove these valves for cleaning it is usually necessary to completely disconnect them from their associated piping which is a process requiring considerable time and labor. Recognizing this difficulty, this invention contemplates a check valve suitable for use in sewage systems in which the valve flapper and the valve seat may be removed for cleaning or replacement without disconnecting the check valve from its piping.

It is one of the objects of this invention to provide a check valve which can be cleaned without being disconnected from its piping.

It is another feature of this invention to provide a check valve with an air pocket arranged above the valve flapper in order to prevent dirt or floating material getting on top of the flapper.

A further object of this invention consists in the provision of a check valve which is readily accessible for cleaning and replacement of parts and which has a minimum number of parts.

A still further object of this invention is the provision of a check valve in which the wearing parts are easily renewable, and which is relatively easy to manufacture.

For a full comprehension of this invention reference should be had to the following drawings in which:—

Fig. 1 is the longitudinal vertical section through a valve constructed according to my invention.

Fig. 2 is a section on the line 2—2 of Fig. 1 looking in the direction of the arrows.

Fig. 3 is a plan view of the valve and

Fig. 4 is a detailed section on a larger scale taken on line 4—4 of Fig. 1.

As best shown in Figs. 1 and 3, the valve casing is composed of two parts comprising a main housing 10 which contains the valve proper and an auxiliary housing 11 which may be of any desired form, but is shown in the figures as an elbow, however it is to be understood that the valve may be made straight through or of any desired angle. The parts 10 and 11 are provided with flanges 12 and 13 respectively, which are adapted to be bolted together as shown at 14 and are each provided on their opposite ends with flanges 15 and 16 respectively, whereby they may be connected in the usual manner to the piping with which the valve may be associated.

The main housing 10 is substantially cylindrical in form and has on the end remote from the auxiliary housing 11 a flat end wall 17 connected to the flange 15 by means of a straight cylindrical section 18. The flange 15, the wall 17, and the cylindrical section 18 have a transverse bore of a diameter corresponding to the pipe size with which the valve may be used and communicating with the interior of the housing. A flat metal plate 20, preferably formed of bronze, is adapted to fit against the flat inner surface of the end wall 17 and have a water-tight connection therewith. This plate is adapted to be held in position by means of four bolts 21 passing through the wall 17 and engaging with threaded bores in the bosses 22 formed integral with the plate 20. Copper washers 23 are interposed between the heads of these bolts and the outer face of the end wall 17 in order to make a water-tight joint thus eliminating the necessity of a packing member between the plate 20 and end wall 17 and rendering the assembly of the valve much simpler. Extending from the center of the plate 20 is an integral tubular sleeve 24 having a bore forming a continuation of the bore 19 and having its end surface ground perfectly flat to form a seat for the valve flapper, said end surface being disposed in an inclined plane the top of which slopes toward the plate 20.

The valve flapper 25 is adapted to cooperate with the valve seat and is preferably cast from bronze and includes the circular disc 26 of a size sufficient to properly cover the valve seat, and has extending therefrom the two ribs 27 converging toward each other to the circumference of the flapper and then becoming parallel to each other and having enlarged ends 28 which are transversely drilled as at 29 to receive a hinge rod 30 about which they are adapted to rotate. The hinge rod 30 is supported by a pair of upstanding lugs 31 formed integral with and extending vertically upward from the sleeve 24 and having on their upper surfaces transverse grooves or seats 32 in which the hinge rod 30 is adapted to rest with its upper surface extending slightly above the upper surfaces of the lugs. The lugs are so spaced apart that the enlarged ends 28 of the ribs 27 fit snugly between them to thus prevent any endwise movement of the valve flapper. The transverse grooves 32 in the lugs 31 supporting the hinge rod 30 are carefully positioned so that the front face of the valve flapper which is ground to a plane surface makes an accurate contact with the valve seat. It will be noted that the position of the valve flapper is such that it is normally held closed by gravity.

In order to gain access to the interior of the valve housing 10 without disconnecting it from its piping there is provided an opening 33 in the upper surface of the housing 10 which is somewhat widened and flattened at the top for this purpose. This opening is rectangular in form and is directly above the valve flapper and valve seat and is of such a size that the valve flapper and valve seat with its integral plate 20 may be withdrawn therethrough after the removal of the bolts 22. A cover plate 34, of substantially rectangular form, is provided to cover the aperture 33, and its under surface at the edges thereof is ground to form a tight seat with the ground surface 35 surrounding the aperture 33. The cover plate 34 is provided with the transverse stiffening ribs 36 and the longitudinal rib 37 and at the points of intersection of these ribs there are enlarged bosses 38 having flat upper surfaces. The under surface of the cover 34 is provided with three depending lugs, the two lugs 39 being identical and so located and of such a length as to engage the upper surface of the hinge rod 30 just above the lugs 31 to retain it rigidly in position in the grooves 32 when the cover plate 34 is tightly clamped in position as will be explained later. The third lug 40 is positioned centrally of the length of the cover plate near one of the long edges thereof and projects downwardly a distance sufficient to cooperate with the rear face of the valve flapper 25 and form a stop therefor, preventing the flapper from reaching a horizontal position.

In order to removably retain the cover plate 34 in position, there is provided the transverse locking bar 41 provided with two spaced vertical threaded bores adapted to receive the adjusting bolts 42, so spaced and positioned as to engage the bosses 38 on the top of the cover plate. The bar 41 is supported above the cover plate by means of the screws 42 resting thereon and it is retained against upward movement by means of the bolts 43—43', the heads of which are engaged under forked lugs 44 integral with the body of the valve. It will be understood that the bolts can be disengaged from the lugs by movement transversely of the casing. The bolt 43, as viewed in Figures 2 and 3, passes through a circular bore 45 in the bar 41 and is retained therein by the nut 46, while the bolt 43' passes through a similar bore which is, however, connected by means of a slot 47 to the end of the bar. This slot 47 is of sufficient width to allow for the passage of the bolt 43'. A nut 46' serves to retain the bolt 43' in position. With the bar in position as shown in Figure 2, and the bolts 42 adjusted to cause it to be substantially parallel to the top of the cover plate, the nuts 46—46' may be tightened to retain the cover plate in position. When it is desired to gain access to the inside of the valve casing such as for the purpose of cleaning or renewing the flapper, it is only necessary to slightly loosen the nut 46' on bolt 43' when that bolt may be withdrawn transversely through the slot 47 and the slot in the lug 44. The bar 41 can now be slightly lifted and slid toward the left whereby the bolt 43 is disengaged from under the lug 44 and the bar can be removed. Plate 34 can then be lifted, exposing the interior of the valve casing and at the same time releasing the hinge pin 30 which can then be lifted, carrying with it the valve flapper. If desired, the valve seat can then be withdrawn after removing the four screws 21, and if upon inspection it is found to be worn, can be readily replaced.

In order to prevent floating particles of solid matter getting on top of the valve flapper and thus obstructing its opening, there is provided a depending wall 48 on the auxiliary valve casing, on the side adjacent the main casing, and this wall is so positioned that it is substantially above the outer edge of the valve flapper when the flapper is open and together with the end wall 17 of the casing 10 serves to form an air pocket above the valve flapper preventing the entrance of any liquid above the flapper when in an open position and thus effectually preventing the entrance of any solid floating matter, and materially reducing the possibility of clogging.

From the above explanation it may be readily ascertained that this invention provides a material improvement in check valves for sewage ejectors in which the valve flapper is protected against clogging and in which access may be gained to the flapper and to the valve seat for cleaning, inspection or renewal without disconnecting any of the pipes from the valve casing and in which the number of parts is reduced to the minimum.

The valve casing may be formed of cast iron or any other suitable material, but it is desirable that the valve seat and valve flapper be formed of bronze. It is to be understood that this invention is not limited to these particular materials nor to the specific construction disclosed in the drawings, which construction is only exemplary, but is to be construed as covering all constructions within the scope of the appended claim.

Having thus described my invention what I claim as new and desire to be secured by Letters Patent is:

A check valve of the class described in combination with the valve casing and removable valve seat and flapper, an opening in said casing through which said removable parts may be withdrawn, a flat rim surrounding said opening, a removable cover adapted to rest on said rim and close said opening, a bar extending over said cover, adjustable means supporting said bar from said cover, a bolt passing through one end of said bar, spaced lugs on said casing adapted to retain the head of said bolt, a bolt at the opposite end of said bar, said bolts being completely removable in the direction of the length of said bar.

In testimony whereof I hereunto affix my signature.

IRVING C. JENNINGS.